Jan. 22, 1935.  C. SCHENK  1,988,463
AIRPLANE ATTITUDE INDICATOR
Original Filed Sept. 4, 1929
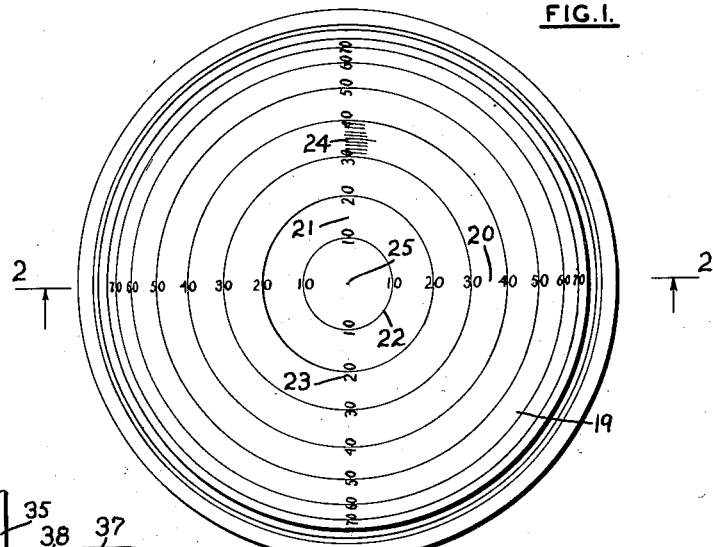
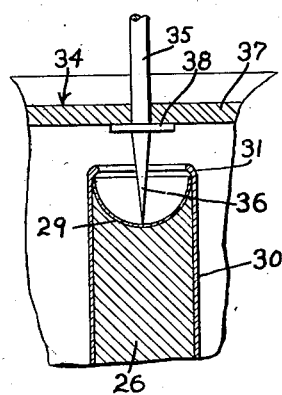
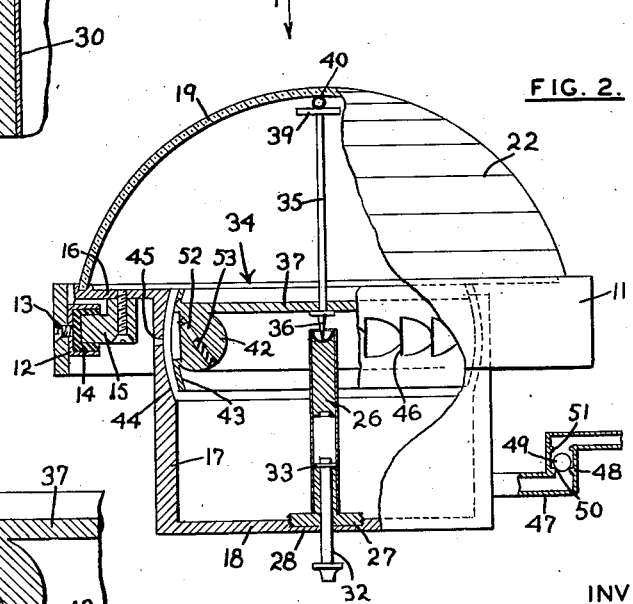
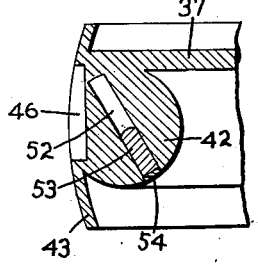
INVENTOR
CARL SCHENK
BY Hazard and Miller
ATTORNEYS Patented Jan. 22, 1935

1,988,463

UNITED STATES PATENT OFFICE 1,988,463

AIRPLANE ATTITUDE INDICATOR

Carl Schenk, Los Angeles, Calif.

Application September 4, 1929, Serial No. 390,393
Renewed March 10, 1934

20 Claims. (Cl. 33—204)

My invention pertains to an airplane turn bank position indicator and sextant with artificial horizon in which both use the principle of a gyroscope, the gyroscope maintaining a pointer substantially vertical or the mirror in a substantially horizontal plane.

My invention pertains to a type of indicator in which a gyroscope rotates on a pivot point, the energizing force preferably being air derived from an engine or from the movement of the airplane.

One of the objects of my invention is a gyroscope, which when at rest has a pendulum action, that is with the center of gravity below the pivot or rotational point and in which when the gyroscope rotates the center of gravity rises so that the device rotates in a manner similar to a top with the center of gravity but slightly below the point of support. To effect this I have the peripheral part of the rotor of the gyroscope provided with movable weights. These weights are preferably located in upwardly and outwardly sloping channels and the weight may be provided by metal pellets or by a liquid such as mercury. The weights when the gyroscope is at rest occupies the lower portions of the channel bringing the center of gravity below the pivotal point, but when the gyroscope rotates at high speed the centrifugal force thrusting the movable weights outwardly also causes them to rise and thus bring the center of gravity slightly below the point of rotation.

In my indicator I employ a stem or pointer which is connected to the gyroscope preferably being in a vertical line with the pivotal point, that is the axial center of the gyroscope and the end of the pointer are slightly spaced from a dome having a spherical curvature, the dome being marked in various degrees. The dome is fixedly connected to the airplane so that as the pointer of the gyroscope shifts, it indicates the degree of inclination and the direction of such inclination.

In a type of gyroscope indicator as above described, a further object of my invention is the construction of a pivotal mounting for the gyroscope having means in connection therewith to shift the rotor and the pointer to prevent rotation thereof, this being done by bodily moving a sleeve which engages part of the stem or spindle or of the rotating disk of the gyroscope and elevates this, bringing the upper end of the pointer or of a rotatable part of the gyroscope into contact with a fixed structure.

Another feature of my invention pertains to the mounting of the gyroscope as a whole in a frame in which a plurality of adjusting and securing points are attached by a resilient connection to an outside frame, which frame may be secured in the airplane body. This gives an easily connected and adjustable mounting so that the indicator as a whole can be located with the dome properly centered.

A detailed feature of my invention is in connection with the pointer, this having a disk mounted at the top which may be of one color and a pole or other indicating device of another color, thus making a device which is readily observable through the fixed glass dome.

My invention is illustrated in the accompanying drawing, in which,

Figure 1 is a plan taken in the direction of the arrow 1 of Fig. 2;

Fig. 2 is a vertical diametrical section on the line 2—2 of Fig. 1 in the direction of the arrows;

Fig. 3 is a detail view of the bearing and spindle of Fig. 2 enlarged;

Fig. 4 is a detail similar to part of Fig. 2, showing the movable parts of the gyroscope.

In constructing my invention I attach a suitable ring 11 to a fixed part of the fuselage of an airplane and in this circle preferably at three points I fit metal cups 12, these being attached by bolts 13. The cups have rubber packing 14 therein and in these cups are fitted angular brackets 15. These brackets are secured to the flange 16 of a chamber body 17 which is preferably cylindrical having a base 18. A glass dome 19 is secured on the flange 16; these structures forming a fixed part of the gyroscope and therefore shift with the machine. The glass dome 19 preferably has what might be termed a fore and aft line 20 accurately mounted in the fore and aft direction of the airplane and a transverse line 21 extending in a true transverse line of the airplane. A series of circles 22 are also made on the glass dome, these being illustrated as spaced 10 degrees apart (note element 23). In order to obtain a finer reading the 10 degrees spacing may also be further graduated as indicated at 24. I carry these degree markings to substantially 90 degrees from the center 25. The lines 21 and the circular lines with the numbers may be indicated in luminous paint.

The pedestal 26 is illustrated as being of cylindrical construction and having a head 27 which is secured in a socket 28 of the base. This has at its upper end a hemispherical bearing surface 29. A sleeve 30 is slidably mounted on the pedestal and has an internal rim 31 at the top which extends around the equatorial line of the inverted hemisphere 29. In order to raise or lower the sleeve I provide an operating rod 32 extending upwardly through a central bore in the pedestal. This has a pin 33 which extends through diametrical slots in the pedestal. On thrusting upwardly on the rod 32 the sleeve may be raised and stop the rotation or brake the rotor of the gyroscope as hereinunder detailed. The gyroscope rotor designated generally by the numeral 34 has a spindle 35, this having a lower pointed end 36 which rides in the hemispherical bearing 29. The spindle extends through a disk 37 and is illustrated attached thereto by means of a flange 38. At the top of the spindle there is a small disk 39 and indicator ball 40 thereon. The top of the disk and the ball may have a luminous paint thereon.

The peripheral section of the rotor has a large body structure 42 to provide sufficient weight and on the outside there is a spherical surface 43 made concentric with the point of rotation, this being the bottom end of the spindle riding on the bearing 29. The chamber body also has a concentrical spherical surface 44 and this has preferably four intake openings 45 to allow inflow of air. The peripheral portion of the rotor is provided with turbine blades 46, these being illustrated in the form of notched sockets of a ratchet type appearance.

The air flow through the gyroscope turbine is by means of a suction pipe 47 having an upward turn 48 with a ball valve 49 fitted therein, this ball being adapted to seat on a bottom seat 50 and to be drawn up striking lugs 51 which prevent its upward displacement. The pipe 47 may be connected to a Venturi tube having an air intake located on the wings or fuselage of the airplane and hence suck air through the intake ports 45; or the pipe 47 may be connected to the intake manifold of the engine, in which case the ball valve prevents the gas being blown into the chambered structure 17 by back fire. As the dome and its mounting is air tight, the suction of air entering the ports 45 rotates the gyroscope rotor.

The means to change the center of gravity of the gyroscope rotor comprises inclined recesses 52 in the heavy body structure 42 of the rotor and these recesses each contain a movable weight 53 which may be in the nature of metal pellets or mercury. Each recess is closed by a plug 54.

The manner of operation and functioning of my gyroscope is substantially as follows: The rotating point of the stem is enabled to follow the hemispherical surface 29 so that when the airplane is at an inclination either descending or climbing or banking or a combination of both, the spindle will bear against the lowermost point of this hemisphere 29 and although all of the intake ports may not be adjacent the turbine blades of a rotor, nevertheless there are a sufficient number to rotate the rotor at high speed. When the rotor is at rest the center of gravity of the rotor is some little distance below the point of rotation of the spindle of the hemisphere 29. However, when the speed of rotation increases, the movable weights are forced outwardly by a centrifugal action and hence upwardly in the inclined recesses 52. This raises the center of gravity of the rotor as a whole so that it is preferably but a short distance below the point of rotation. In the first place with the center of gravity low, the rotor will act somewhat as a pendulum, the disk 37 maintaining the horizontal position and the spindle being vertical, but this would not be satisfactory on rotating, being insufficiently sensitive. Therefore by raising the center of gravity of the rotor I obtain a gyroscope which rotates somewhat like a top and which is sufficiently stable so that it does not change the position due to the precession action of the gyroscope. The ball forms a pointer and thus by noting the position of the ball in reference to the fore and aft, the transverse lines and the circular lines, a pilot may read an inclination whether ascending or descending on a bank or a combination of both.

If for any reason it is desired to stop the rotation of the rotor the rod 32 may be pressed upwardly, thereby clearing the sleeve 30; the rim 31 of the sleeve engaging against the underside of the disk 37. This bodily lifts the rotor until the ball 41 engages the inside of the sphere. A function of the inturned rim 31 is to prevent the rotary pointer 36 of the stem from jumping or slipping out of the hemispherical bearing 29 should the plane have an inclination in any direction substantially equal to or greater than 90 degrees. It is to be understood however, that should the plane undergo any stunting, such as looping the loop or barrel rolling, that the pilot could stop the rotation of the rotor in the manner above described.

A feature of my invention is that the pointed end 36 of the spindle 35 forms a spinner for the rotation of the weighted part of the rotor. This rotor normally has its center of gravity quite low but on account of the inclined recess 52, the movable weight 53 can move upwardly and, therefore, raise the center of gravity. This makes the rotor more sensitive in its action in registering changes of inclination.

Another feature to be noted is that these recesses 52 are entirely separate and independent one of the other so that the mercury in one recess has no connection with that in another and, therefore, there is no action of one moving weight with another.

A characteristic feature of my invention as it concerns the mobile weights is that the inclined recesses or chambers containing these weights are substantially on vertical planes, these planes being on radii from the center of the rotor. The weights are thus confined in relatively small bodies and can only have a combined radial and upward movement, the radial movement being outwardly and the upward movement raising the center of gravity.

Various changes may be made in the principles of my invention without departing from the spirit thereof as set forth in the description, drawing and claims.

I claim:

1. In a device as described, a fixed pedestal having a cup-shaped hemispherical bearing at the top, a gyro rotor having a spindle rotatable in the said bearing, the rotor having a peripheral ring, said ring depending below the bearing point and having upwardly and outwardly inclined sockets therein and movable weights in said sockets adapted to be forced upwardly and outwardly due to centrifugal action, the pedestal having a sleeve with an inturned rim at the top to engage the said spindle and retain said spindle in the bearing when said rotor operates at a considerable angle to the pedestal.

2. In a device as described, a gyroscope housing having a pedestal with a cup-shaped bearing at its upper end, a sleeve slidably mounted on said pedestal, a gyroscope rotor having a spindle rotating in said bearing with a weighted structure connected to the spindle, the spindle extending upwardly and forming a pointer, a dome-shaped scale member mounted in a fixed relation to the pedestal, means to rotate the rotor and an operating rod extending up through the pedestal and connected to the sleeve to shift said sleeve upwardly, such upward shift of the sleeve bringing the upper end of the pointer in contact with the dome and restraining the rotation of the rotor by the said sleeve engaging the rotor.

3. In a device as described, a ring adapted to be mounted in a fixed position on an airplane and having inwardly facing cups spaced around its inner surface with resilient material therein, a gyroscope housing having brackets to fit in said cups and engaging the resilient material, a pedestal mounted in the housing and having a cup-shaped bearing at the top, a gyroscope rotor having a spindle rotatably mounted in the bearing, the rotor having an annular weighted structure with propeller blades thereon, there being intake ports through the housing adjacent said blades and an outlet connected to the housing, a dome-shaped transparent indicator fixedly mounted on the housing and having indications thereon of the fore and aft and transverse lines and circles showing degrees of inclination, the said spindle extending above the rotor and forming a pointer.

4. In a device as claimed in claim 3, the spindle having a sleeve slidably mounted thereon with an inturned rim at the top to retain the spindle in position and means to shift the sleeve upwardly to engage the rotor and stop the rotation thereof.

5. In a device as described, a gyroscope rotor with a plurality of upwardly and outwardly inclined sockets therein spaced around the periphery thereof and independent one of the other, each socket having a mass therein forming a weight, such masses being adapted to shift upwardly and outwardly by centrifugal force and thereby raise the center of gravity of the rotor when in rotation.

6. In a device as described, a gyroscope rotor operating on a spindle to allow tilting thereof, a plurality of movable weights in the rotor, with means to guide said weights in an upward and outward movement due to centrifugal force to raise the center of gravity of the rotor when under rotation.

7. In a device as described, a gyroscope rotor with a spinner spindle on which it rotates to allow tilting of the rotor, the rotor having passages containing weights, said passages being inclined upwardly and outwardly for guidance of such weights due to centrifugal force, the upward movements of the weights raising the center of gravity of the rotor.

8. In a device as described, a bearing, a spinner spindle journaled thereon, a gyro rotor connected to the spindle and having a plurality of upwardly and outwardly inclined recesses each with a closure plug at the bottom, and a movable weighting material in each recess, the weighting material being adapted to shift upwardly on the rotational movement of the rotor due to centrifugal action and thus raise the center of gravity of the rotor.

9. In a device as described, a chamber body with a supporting bearing extending upwardly therefrom and having a cup-shaped bearing at the top, a spinner spindle journaled in said bearing and having a disk-like rotor with a heavy weighted peripheral ring, such ring having a plurality of upwardly and outwardly inclined recesses with a closure for such recesses and a liquid weight in each recess, the chamber body having a plurality of brackets extending outwardly therefrom, a fixed ring having a plurality of cups with a resilient packing therein, said brackets fitting in said packing forming a mounting for the chamber body.

10. In a device as described, a gyroscope rotor, a bearing structure in which said rotor is mounted, the bearing structure having a plurality of brackets connected thereto, a fixed ring having a plurality of cups each with a packing material, the brackets fitting in said packing material and forming a mounting for the bearing portion of the gyroscope.

11. In a device as described, a fixed bearing, a gyroscope rotor having a spindle journaled in said bearing, said rotor being fixedly connected to the spindle and comprising a heavy peripheral ring, such ring having a plurality of upwardly inclined recesses, a movable weighting material in each recess, the center of gravity of the gyroscope being below the bearing point of the spindle on the bearing when the device is at rest, the weighting material being adapted to shift upwardly on the rotational movement of the rotor due to centrifugal action and thus to raise the center of gravity of the gyroscope as a whole relative to such bearing, said bearing and the mounting of the spindle thereon permitting tilting of the gyroscope as a whole relative to said bearing.

12. In a device as claimed in claim 11, said bearing being cup-shaped, and the spindle having a point bearing therein, a sleeve surrounding the bearing and having an internal rim at the top, such rim being adapted to restrain the bearing portion of the spindle from disengaging with said cup-shaped bearing when the rotor tilts.

13. In a device as claimed in claim 11, said bearing being at the top of a fixed pedestal, said pedestal having a longitudinal slot therein, a sleeve surrounding the pedestal, an operating rod extending through the lower portion of the pedestal and having a pin operating in said slot and connecting to the sleeve, whereby said sleeve may be lifted or lowered by said pin, the sleeve being adapted to engage a portion of the gyroscope to operate as a brake.

14. In a device as described, a fixed pedestal having a cup-shaped bearing at the top, a stem journaled therein and having a heavy rotor connected to said stem, a movable sleeve on the pedestal and having an inturned rim to retain said stem in its operating position in the cup-shaped bearing.

15. In a device as claimed in claim 14, said pedestal having a longitudinal slot, an operating pin extending through the pedestal into the slot and having a pin engaging said sleeve to raise and lower the sleeve into engagement with a moving part of the rotor.

16. A gyroscope having a rotor with mobile weights confined to move outwardly and upwardly in substantially vertical radial planes, said rotor being mounted to rotate on a vertical axis with its center of gravity normally below its point of support, the weights being responsive to centrifugal force whereby said weights are moved outwardly and upwardly to cause the center of gravity and the point of support of the rotor to more nearly coincide.

17. A gyroscope having a rotor of a top type with mobile weights confined to move outwardly and upwardly in vertical radial planes, the rotor being mounted to rotate on its vertical axis with its center of gravity below its point of support, the centrifugal force moving the weights outwardly and upwardly to bring the center of gravity closer to the point of rotation.

18. In a device as described, a fixed pedestal having a cup-shaped bearing at the top, an inturned rim at the upper edge of the bearing, a stem journaled in the cup-shaped bearing and having a heavy rotor connected thereto, said inturned rim being adapted to retain said stem in its operating position in the cup-shaped bearing.

19. In a device as described, a rotor of a gyroscope having a bearing point, a hemispherical bearing cup for said bearing point, and an inturned guard rim at the equatorial line of the bearing cup.

20. In a device as described, a gyroscope rotor having a bearing point, a bearing cup for said point, and a concentric bearing guard on said cup sloping upwardly and inwardly toward a vertical line through the center of the cup.

CARL SCHENK.